United States Patent
Aptiogullari et al.

(10) Patent No.: US 12,049,970 B2
(45) Date of Patent: Jul. 30, 2024

(54) FLANGE FOR A HOSE

(71) Applicant: Danfoss Power Solutions II Technology A/S, Nordborg (DK)

(72) Inventors: Erhan Aptiogullari, Tekirdag (TR); Hasan Donmez, Istanbul (TR); Ozgur Caliskan, Cerkezkoy (TR); Salih Karayagiz, Istanbul (TR); Recep Muco, Corlu (TR); Ilkay Dede, Corlu (TR)

(73) Assignee: DANFOSS A/S, Nordborg (DK)

( * ) Notice: Subject to any disclaimer, the term of this patent is extended or adjusted under 35 U.S.C. 154(b) by 118 days.

(21) Appl. No.: 17/425,700

(22) PCT Filed: Jan. 13, 2020

(86) PCT No.: PCT/EP2020/050696
§ 371 (c)(1),
(2) Date: Jul. 23, 2021

(87) PCT Pub. No.: WO2020/151981
PCT Pub. Date: Jul. 30, 2020

(65) Prior Publication Data
US 2022/0163146 A1    May 26, 2022

(30) Foreign Application Priority Data

Jan. 25, 2019  (GB) ..................... 1901012

(51) Int. Cl.
*F16L 23/028*  (2006.01)
*F16L 23/00*  (2006.01)
(Continued)

(52) U.S. Cl.
CPC ......... *F16L 23/0286* (2013.01); *F16L 23/003* (2013.01); *F16L 33/28* (2013.01); *F16L 25/0036* (2013.01)

(58) Field of Classification Search
CPC ..... F16L 23/0286; F16L 23/02; F16L 23/028; F16L 23/032; F16L 33/28; F16L 25/0036; F16L 47/14
(Continued)

(56) References Cited

U.S. PATENT DOCUMENTS 2,568,414 A * 9/1951 Russ .............................. 285/414
3,085,820 A * 4/1963 Pollia ...................... F16L 23/02
285/415
(Continued)

FOREIGN PATENT DOCUMENTS

CN         1621728 A    6/2005
CN       204628863 U    9/2015
(Continued)

OTHER PUBLICATIONS

KR-269937-B1—Machine Translation—English (Year: 2000).*
(Continued)

*Primary Examiner* — William S. Choi
(74) *Attorney, Agent, or Firm* — Merchant & Gould P.C.

(57) ABSTRACT

Flange for a hose (2), which flange comprises: —an annular flange body (4) having a central hose opening (5); —an annular locking element (9) for locking the annular flange body (4) in a circumferential groove (3) of a hose (2), which annular locking element (9) is composed out of at least two generally arc shaped locking element parts (9), wherein the annular locking element (9) is concentrically arranged in the central hose opening (5) of the annular flange body (4); and —couplings (7, 8) for each of the at least two generally arc shaped locking element parts (9), wherein each coupling (7, 8) has a first coupling part (7) arranged on the annular flange body (4) and a second coupling part (8) arranged on the respective arc shaped locking element part (9), which first coupling part (7) couples to the second coupling part (8).

15 Claims, 3 Drawing Sheets

(51) Int. Cl.
*F16L 25/00* (2006.01)
*F16L 33/28* (2006.01)

(58) Field of Classification Search
USPC .......................................... 285/411, 414, 415
See application file for complete search history.

(56) References Cited

U.S. PATENT DOCUMENTS

| | | | |
|---|---|---|---|
| 3,934,902 | A | 1/1976 | McNamee |
| 9,568,129 | B2 * | 2/2017 | Griffin .................... F16L 23/02 |
| 2002/0109349 | A1 | 8/2002 | Rochelle |
| 2004/0187543 | A1 | 9/2004 | Frigo et al. |
| 2005/0146139 | A1 | 7/2005 | Huybrechts et al. |

FOREIGN PATENT DOCUMENTS

| | | |
|---|---|---|
| CN | 204829023 U | 12/2015 |
| CN | 106439306 A | 2/2017 |
| EP | 775864 A1 * 5/1997 | ............. F16L 33/28 |
| GB | 1 350 199 A | 4/1974 |
| JP | 2012-145192 A | 8/2012 |
| KR | 269937 B1 * | 10/2000 |
| WO | 2012/163888 A2 | 12/2012 |

OTHER PUBLICATIONS

EP-775864-A1—Machine Translation—English (Year: 1997).*
International Search Report and Written Opinion of the International Searching Authority for International Patent Application No. PCT/EP2020/050696 mailed Mar. 12, 2020, 9 pages.
British Search Report for British Patent Application No. GB1901012.3 mailed Jun. 28, 2019, 3 pages.
Chinese First Office Action for Application No. 202080023535.4 mailed Jul. 26, 2022, 4 pages.
Chinese Search Report for Application No. 202080023535.4 mailed Jul. 26, 2022, 3 pages.

* cited by examiner

FLANGE FOR A HOSE

CROSS-REFERENCE TO RELATED APPLICATIONS

This application is a National Stage Application No. PCT/EP2020/050696, filed 13 Jan. 2020, which claims benefit of Ser. No. 1901012.3, filed 25 Jan. 2019 in Great Britain, the disclosures of which are incorporated herein by reference in their entireties. To the extent appropriate, a claim of priority is made to each of the above-disclosed applications.

TECHNICAL FIELD

The invention relates to a flange for a hose.

BACKGROUND

It is known to connect hoses, like rubber hoses, with a flange to another hose or to a hydraulic device, such as a valve block or the like. The flanges can be embedded in the rubber hoses to ensure a good connection between the hose and the flange. However, embedding a flange in a rubber hose must be done during the manufacturing of the hose and at such a moment in time it is often not known how the hose will be used.

It is also known to provide hoses on an end with a circumferential groove. The flange is manufactured as two arc shaped elements, which together form an annular flange. The two arc-shaped elements have overlapping parts in the axial direction with which the arc-shaped elements are bolted together and positioned in the circumferential groove of the hose. The disadvantage of this construction is that the overlapping parts of the arc shaped-elements have a reduced thickness, i.e., half of the thickness of the flange, which is the weakest point of the flange.

When such a split flange, composed out of two arc-shaped elements, is subjected to unequal forces, the risk is present that the flange will bend at the overlapping parts as the thickness of the flange is reduced at said position. In order to reduce said risk, the flange needs to be excessively thick such that even the overlapping parts are thick enough to withstand the unequal forces.

It is an object of the invention to reduce or even remove the above mentioned disadvantages.

SUMMARY

This object is achieved according to the invention with a flange for a hose, which flange comprises:
- an annular flange body having a central hose opening;
- an annular locking element for locking the annular flange body in a circumferential groove of a hose, which annular locking element is composed out of at least two generally arc-shaped locking element parts, wherein the annular locking element is concentrically arranged in the central hose opening of the annular flange body; and
- couplings for each of the at least two generally arc-shaped locking element parts, wherein each coupling has a first coupling part arranged on the annular flange body and a second coupling part arranged on the respective arc-shaped locking element part, which first coupling part couples to the second coupling part.

The flange according to the invention has a single-piece annular flange body, which does not have any overlapping parts, which reduce the thickness of the flange. The central hose opening is dimensioned such that a hose can be inserted into the central hose opening without any deformation.

The annular locking element of the flange according to the invention is composed out of at least two arc-shaped locking element parts, which can be positioned into a circumferential groove of a hose end. The annular flange body can be shifted over the annular locking element to keep the annular locking element in position.

The couplings ensure that the annular flange body is coupled to the annular locking element and ensures that the annular flange body and annular locking element can no longer shift relative to each other, resulting in a flange which extends into the circumferential groove at the hose end.

Because the flange according to the invention extends into the circumferential groove and because the flange has a single-piece annular flange body, the flange has an even strength distributed along the circumference of the flange and as a result the thickness of the flange can be optimized.

In a preferred embodiment of a flange according to the invention, the first coupling part is a groove extending in axial direction from a first end surface of the annular flange body, wherein the length of the groove is smaller than the thickness of the annular flange body and wherein the second coupling part is a protrusion arranged on a radially outer surface of the respective locking element part, which protrusion has in axial direction a cross-section corresponding to the cross-section of the groove.

Because the groove does not extend over the full width of the annular flange body and because the protrusions correspond to the groove in cross-section, it is possible to tighten the annular flange body against another flange body or the like, such that the hose end is compressed also against the other flange body, causing a reliable seal.

Preferably, the cross-section of the protrusion and the cross-section of the groove are T-shaped.

With the T-shaped cross-sections, it is possible to transfer forces as well as torque between the annular flange body and the annular locking element.

In yet another embodiment of the flange according to the invention, the outer diameter of the annular locking element corresponds with the diameter of the central hose opening. With corresponding diameters, it is possible to provide a tight fit of the annular locking element in the annular flange body.

In still a further embodiment of the flange according to the invention, the annular flange body has a number of axially extending through holes evenly positioned along the circumference of the annular flange body.

Bolts can be extended through the through holes to tighten the flange according to the invention against another flange.

The invention also relates to a combination of a flange according to the invention and a hose having an outer diameter smaller than the diameter of the central hose opening and larger than the inner diameter of the annular locking element, which hose has on an end a circumferential groove, in which the annular locking element is at least partially accommodated.

These and other features of the invention will be elucidated in conjunction with the accompanying drawings.

DETAILED DESCRIPTION

Figure 1:
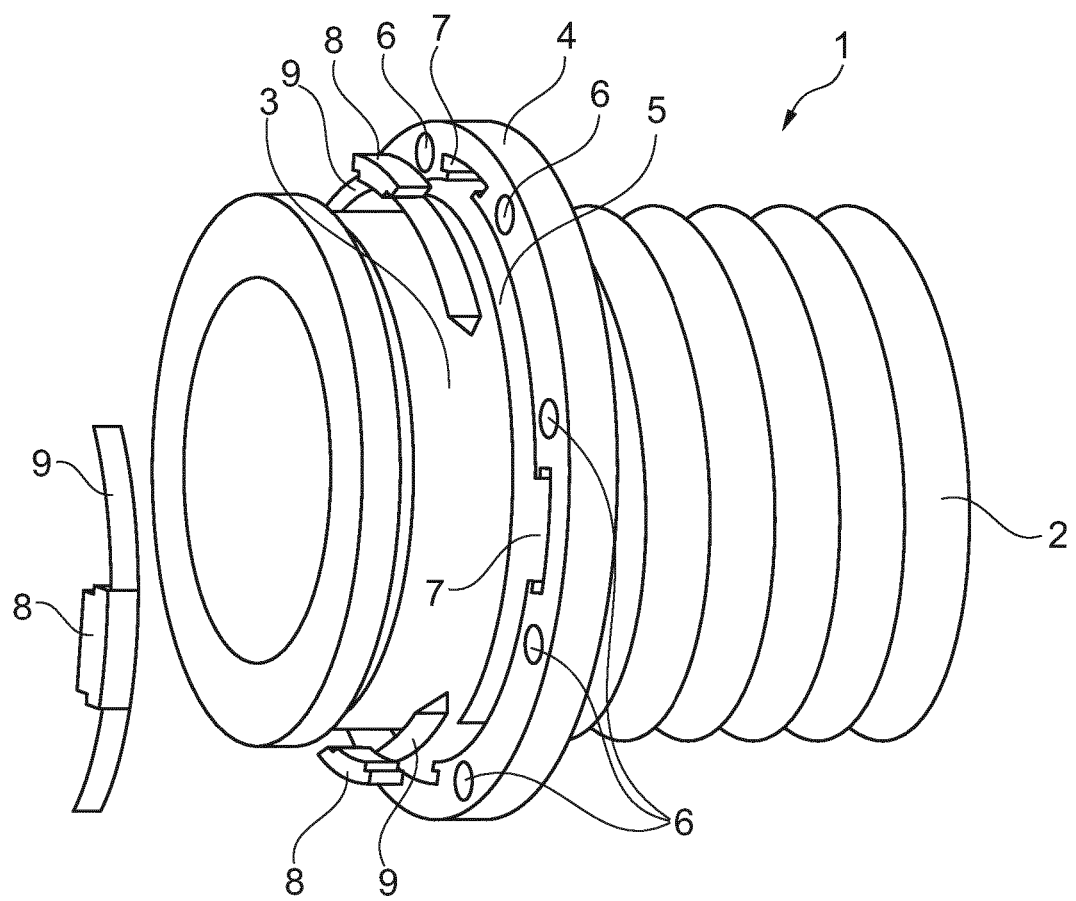
FIG. 1 shows a perspective view of an embodiment of a combination according to the invention.

FIG. 1 shows a combination 1 according to the invention. The combination 1 has a hose 2 with a circumferential groove 3 arranged on one end of the hose 2.

An annular flange body 4 is positioned around the hose 2, such that the hose 2 extends through a central hose opening 5.

A number of axially extending through holes 6 are evenly positioned along the circumference of the annular flange body 4 and allow for mounting the flange body 4 to another flange.

The annular flange body 4 furthermore has grooves 7 with a T-shaped cross-section, which correspond with T-shaped protrusions 8 arranged on arc-shaped locking element parts 9, which together can form an annular locking element.

Figure 2:
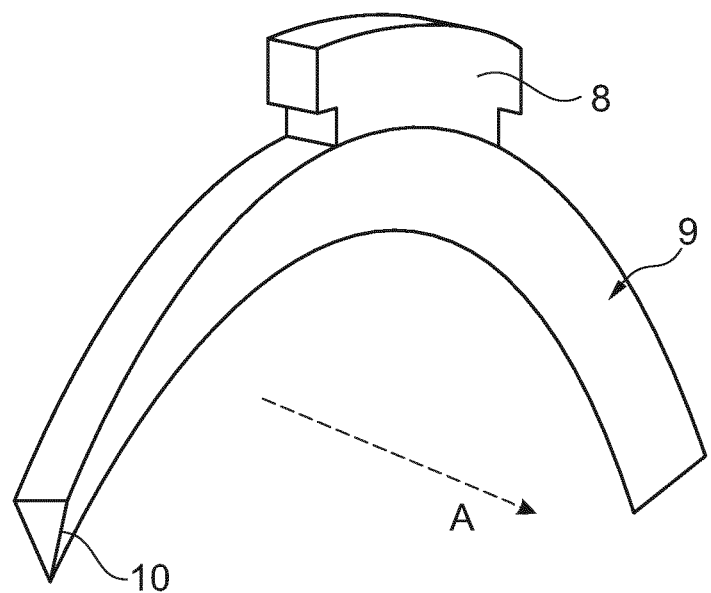
FIG. 2 shows a perspective view of an arc shaped locking element part of the combination according to FIG. 1.

FIG. 2 shows an enlarged perspective view of an arc-shaped locking element part 9 provided with the protrusion 8, which has, in axial direction A, a T-shaped cross-section.

The arc-shaped locking element part 9 has a slanting contact surface 10, with which the part 9 abuts a side of the groove 3 of the hose 2.

Figure 3:
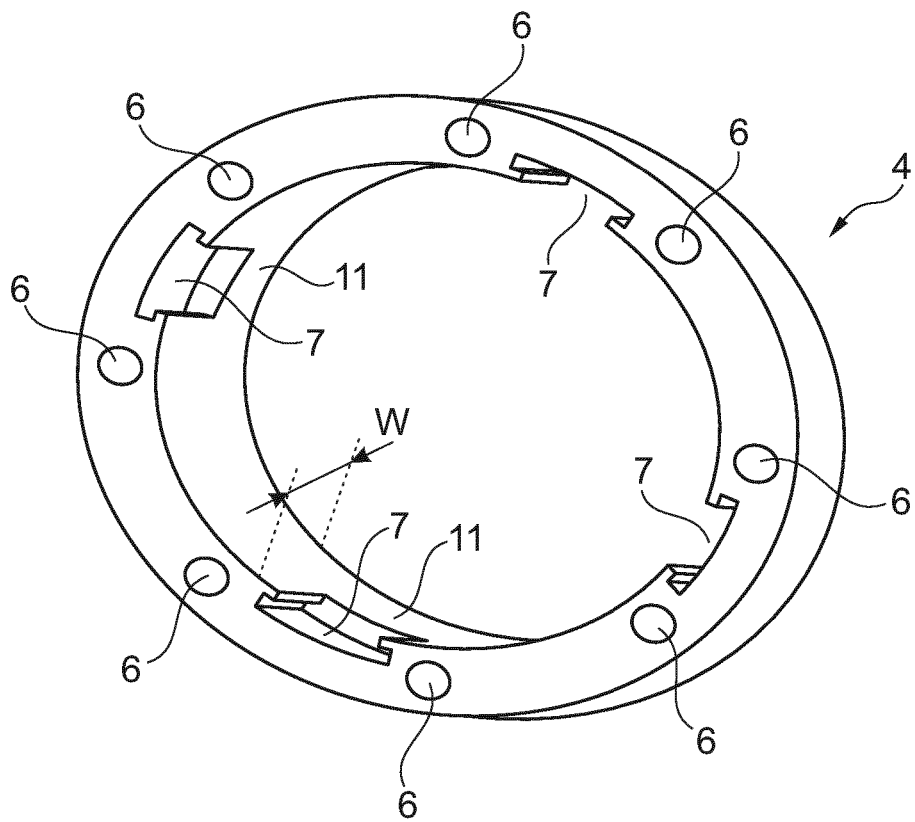
FIG. 3 shows a perspective view of the annular flange body of the combination of FIG. 1.

FIG. 3 shows a perspective view of the annular flange body 4. This flange body 4 has a uniform width W and is provided with four grooves 7 with T-shaped cross-section. The length of the grooves 7 is smaller than the width W, such that a stop 11 is provided against which a T-shaped protrusion 8 can rest. This stop 11 allows for an axial force to be exerted from the annular flange body 4 onto the hose 2, such that the hose end can be pressed sealingly against another flange.

Figure 4:
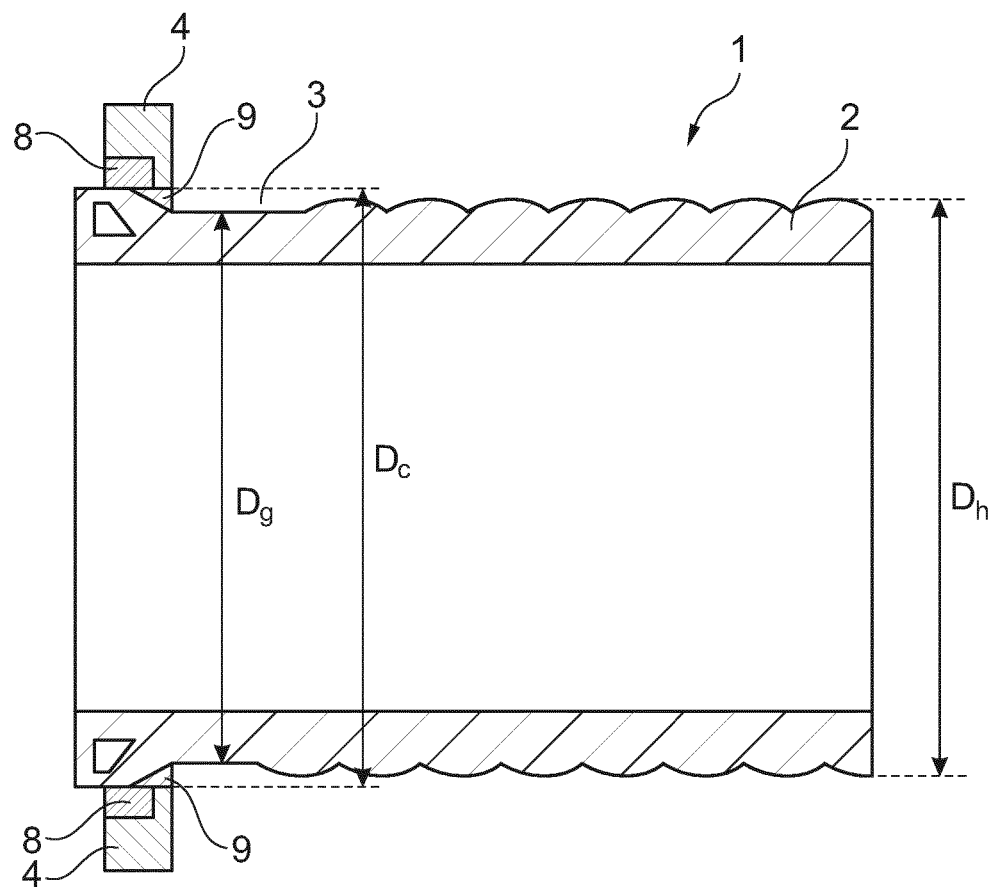
FIG. 4 shows a cross-sectional view of the combination according to FIG. 1 in an assembled state.

FIG. 4 shows a cross-sectional view of the combination 1 of FIG. 1. In this figure, the flange is in assembled state such that the annular locking element 8, 9 is coupled to and arranged concentrically within the annular flange body 4.

As can be seen, a diameter De of the central hose opening 5 is larger than an outer diameter Dh of the hose 2, while the inner diameter of the annular locking element 8, 9 corresponds to a diameter Dg of the groove 3.

The invention claimed is:

1. A flange for a hose comprising:
an annular flange body having a central hose opening;
an annular locking element for locking the annular flange body in a circumferential groove of a hose, which annular locking element is composed out of at least two generally arc-shaped locking element parts, wherein the annular locking element is concentrically arranged in the central hose opening of the annular flange body; and
couplings for each of the at least two generally arc-shaped locking element parts, wherein the couplings have a first coupling part arranged on the annular flange body and a second coupling part arranged on the respective arc-shaped locking element part, which first coupling part couples to the second coupling part, one of the first and second coupling parts including a protrusion protruding from a first surface, the first surface facing radially outward or radially inward, the other of the first and second coupling parts including a groove recessed from a second surface, the second surface facing the first surface, and the first surface and the second surface being configured to abut each other when the protrusion is received in the groove,
wherein a cross-section of the protrusion and a cross-section of the groove are T-shaped.

2. The flange according to claim 1, wherein the first coupling part is the groove recessed from the second surface and extending in an axial direction from a first end surface of the annular flange body, wherein a length of the groove is smaller than a thickness of the annular flange body, and wherein the second coupling part is the protrusion protruding from the first surface of the respective arc-shaped locking element part, which protrusion has in axial direction a cross-section corresponding to a cross-section of the groove.

3. The flange according to claim 1, wherein an inner diameter of the annular locking element corresponds with an outer diameter of the circumferential groove of the hose.

4. The flange according to claim 1, wherein the annular flange body has a number of axially extending through holes evenly positioned along the circumference of the annular flange body.

5. The flange of claim 1, wherein the groove is an axially extending groove, and wherein the protrusion is an axially extending protrusion receivable into the axially extending groove.

6. The flange of claim 5, wherein at least two circumferentially spaced axially extending grooves are provided as one of the first and second coupling parts, and wherein at least two circumferentially spaced axially extending protrusions are provided as the other of the first and second coupling parts.

7. The flange of claim 6, wherein the one of the first and second coupling parts that includes at least two circumferentially spaced axially extending grooves includes four axially circumferentially spaced extending grooves, and wherein the other of the first and second coupling parts that includes at least two circumferentially spaced axially extending protrusions includes four circumferentially spaced axially extending protrusions.

8. The flange of claim 1, wherein the at least two generally arc-shaped locking element parts include a planar slanting contact surface.

9. The flange of claim 1, wherein the annular flange body defines a circumferential outer surface.

10. A flange-hose assembly comprising:
the flange according to claim 1; and
a hose having an outer diameter smaller than an inner diameter of the central hose opening and larger than an inner diameter of the annular locking element, which hose has on an end a circumferential groove, in which the annular locking element is at least partially accommodated.

11. A flange for a hose comprising:
a) an annular flange body having a central hose opening;
b) an annular locking element for locking the annular flange body in a circumferential groove of a hose, which annular locking element is composed out of at least two generally arc-shaped locking element parts, wherein the annular locking element is concentrically arranged in the central hose opening of the annular flange body; and
c) couplings for each of the at least two generally arc-shaped locking element parts, wherein the couplings have a first coupling part arranged on the annular flange body and a second coupling part arranged on the respective arc-shaped locking element part, which first coupling part couples to the second coupling part;

d) wherein the first coupling part is a groove extending in axial direction from a first end surface of the annular flange body, wherein a length of the groove is smaller than a thickness of the annular flange body, and wherein the second coupling part is a protrusion arranged on a radially outer surface of the respective locking element part, which protrusion has in axial direction a cross-section corresponding to a cross-section of the groove;

e) wherein the cross-section of the protrusion and the cross-section of the groove are T-shaped.

12. The flange according to claim 11, wherein an inner diameter of the annular locking element corresponds with an outer diameter of the circumferential groove of the hose.

13. The flange according to claim 11, wherein the annular flange body has a number of axially extending through holes evenly positioned along the circumference of the annular flange body.

14. A flange-hose assembly comprising:
the flange according to claim 11; and
a hose having an outer diameter smaller than an inner diameter of the central hose opening and larger than an inner diameter of the annular locking element, which hose has on an end the circumferential groove, in which the annular locking element is at least partially accommodated.

15. A flange for a hose comprising:
an annular flange body having a central hose opening;
an annular locking element for locking the annular flange body in a circumferential groove of a hose, which annular locking element is composed out of at least two generally arc-shaped locking element parts, wherein the annular locking element is concentrically arranged in the central hose opening of the annular flange body; and couplings for each of the at least two generally arc-shaped locking element parts, wherein the couplings have a first coupling part arranged on the annular flange body and a second coupling part arranged on the respective arc-shaped locking element part, which first coupling part couples to the second coupling part, wherein at least two circumferentially spaced axially extending grooves are provided on one of the first and second coupling parts, and wherein at least two circumferentially spaced axially extending protrusions are provided on the other of the first and second coupling parts; and wherein cross-sections of the circumferentially spaced axially extending protrusions and cross-sections of the circumferentially spaced axially extending grooves are T-shaped.

* * * * *